US012633672B2

(12) United States Patent
Kasani et al.

(10) Patent No.: US 12,633,672 B2
(45) Date of Patent: May 19, 2026

(54) ULTRA-WIDE BANDWIDTH LOW-BAND RADIATING ELEMENTS

(71) Applicant: Outdoor Wireless Networks LLC, Claremont, NC (US)

(72) Inventors: Kumara Swamy Kasani, Godavari Khani (IN); Vijay Srinivasan, Salcette (IN)

(73) Assignee: Outdoor Wireless Networks LLC, Richardson, TX (US)

( * ) Notice: Subject to any disclaimer, the term of this patent is extended or adjusted under 35 U.S.C. 154(b) by 647 days.

(21) Appl. No.: 18/051,625

(22) Filed: Nov. 1, 2022

(65) Prior Publication Data

US 2023/0114554 A1 Apr. 13, 2023

Related U.S. Application Data

(62) Division of application No. 16/343,587, filed as application No. PCT/US2018/039954 on Jun. 28, 2018, now Pat. No. 11,522,298.

(Continued)

(51) Int. Cl.
*H01Q 19/10* (2006.01)
*H01Q 1/24* (2006.01)

(Continued)

(52) U.S. Cl.
CPC ........... *H01Q 19/108* (2013.01); *H01Q 1/246* (2013.01); *H01Q 5/15* (2015.01); *H01Q 9/16* (2013.01);

(Continued)

(58) Field of Classification Search
CPC .......... H01Q 1/246; H01Q 5/15; H01Q 9/065; H01Q 9/26; H01Q 9/16; H01Q 9/28;

(Continued)

(56) References Cited

U.S. PATENT DOCUMENTS 6,028,563 A 2/2000 Higgins
6,067,053 A * 5/2000 Runyon ............... H01Q 21/205 343/820

(Continued)

FOREIGN PATENT DOCUMENTS

CN 201797035 U 4/2011
CN 202178379 U * 3/2012

(Continued)

OTHER PUBLICATIONS

First Examination Report for Indian Application No. 202047004666 (5 pages) (Feb. 6, 2022).

(Continued)

*Primary Examiner* — Ab Salem Alkassim, Jr.
(74) *Attorney, Agent, or Firm* — Myers Bigel, P.A.

(57) ABSTRACT

A dipole antenna includes a reflector, a radiating element, and a feed element. The radiating element includes first and second dipoles above a surface of the reflector. The first and second dipoles respectively include arm segments and are arranged in a crossed dipole arrangement. The feed element includes first and second conductive transmission lines that are electrically isolated from one another and are capacitively coupled to the arm segments of the first and second dipoles, respectively. The arm segments of the first and second dipoles are between the feed element and the surface of the reflector.

14 Claims, 12 Drawing Sheets

Related U.S. Application Data

(60) Provisional application No. 62/529,578, filed on Jul. 7, 2017.

(51) Int. Cl.
*H01Q 5/15* (2015.01)
*H01Q 9/16* (2006.01)
*H01Q 9/28* (2006.01)
*H01Q 21/06* (2006.01)
*H01Q 21/26* (2006.01)
*H01Q 25/00* (2006.01)
*H01Q 21/24* (2006.01)

(52) U.S. Cl.
CPC ............. *H01Q 9/28* (2013.01); *H01Q 21/062* (2013.01); *H01Q 21/26* (2013.01); *H01Q 25/001* (2013.01); *H01Q 21/24* (2013.01)

(58) Field of Classification Search
CPC .... H01Q 9/285; H01Q 19/108; H01Q 21/062; H01Q 21/26; H01Q 25/001
See application file for complete search history.

(56) References Cited

U.S. PATENT DOCUMENTS

| | | | | |
|---|---|---|---|---|
| 6,295,028 | B1 | 9/2001 | Jonsson et al. | |
| 6,333,720 | B1 | 12/2001 | Goettl et al. | |
| 6,342,867 | B1 * | 1/2002 | Bell | H01Q 19/108 343/797 |
| 6,741,220 | B2 * | 5/2004 | Inoue | H01Q 19/28 343/815 |
| 7,238,101 | B2 | 7/2007 | Kadle et al. | |
| 7,405,710 | B2 | 7/2008 | Bisiules et al. | |
| 7,439,927 | B2 | 10/2008 | Lenart et al. | |
| 7,579,999 | B2 * | 8/2009 | Boβ | H01Q 9/06 343/795 |
| 8,269,686 | B2 * | 9/2012 | Johnston | H01Q 21/24 343/858 |
| 8,462,071 | B1 | 6/2013 | Rudish et al. | |
| 9,190,734 | B2 * | 11/2015 | Niver | H01Q 21/26 |
| 9,276,329 | B2 | 3/2016 | Jones et al. | |
| 9,325,057 | B2 * | 4/2016 | Katipally | H01Q 21/24 |
| 9,397,404 | B1 * | 7/2016 | McDevitt | H01Q 21/08 |
| 9,570,804 | B2 | 2/2017 | Shang et al. | |
| 9,698,486 | B2 | 7/2017 | Shooshtari et al. | |
| 9,722,323 | B2 | 8/2017 | Yona et al. | |
| 9,819,084 | B2 | 11/2017 | Zimmerman et al. | |
| 9,979,089 | B2 | 5/2018 | Koskiniemi et al. | |
| 10,439,289 | B2 * | 10/2019 | Ziv | H01Q 21/062 |
| 10,530,068 | B2 * | 1/2020 | Mirmozafari | H01Q 1/246 |
| 11,205,859 | B2 * | 12/2021 | Segador Alvarez | H01Q 5/307 |
| 11,217,905 | B2 | 1/2022 | Fleancu et al. | |
| 11,336,031 | B2 * | 5/2022 | Wang | H01Q 19/108 |
| 11,342,688 | B2 * | 5/2022 | Gonzalez | H01Q 25/001 |
| 11,417,945 | B2 * | 8/2022 | Kasani | H01Q 21/0075 |
| 12,113,290 | B2 * | 10/2024 | Nagashima | H01Q 21/24 |
| 12,148,986 | B2 * | 11/2024 | Wu | H01Q 19/22 |
| 2004/0263392 | A1 | 12/2004 | Bisiules et al. | |
| 2007/0080883 | A1 * | 4/2007 | Boss | H01Q 21/0087 343/797 |
| 2007/0241983 | A1 * | 10/2007 | Cao | H01Q 21/26 343/797 |
| 2008/0309568 | A1 * | 12/2008 | Deng | H01Q 19/104 343/835 |
| 2010/0007571 | A1 | 1/2010 | Riedel | |
| 2012/0081259 | A1 * | 4/2012 | Regala | H01Q 21/26 343/797 |
| 2013/0187822 | A1 * | 7/2013 | Shi | H01Q 19/106 343/821 |
| 2013/0307743 | A1 * | 11/2013 | Moon | H01Q 21/08 343/833 |
| 2014/0111396 | A1 * | 4/2014 | Hyjazie | H01Q 21/26 343/893 |
| 2014/0240188 | A1 | 8/2014 | Mamo et al. | |
| 2015/0070234 | A1 | 3/2015 | Jones | |
| 2015/0138032 | A1 | 5/2015 | Yona et al. | |
| 2015/0295313 | A1 | 10/2015 | Zimmerman et al. | |
| 2016/0248161 | A1 | 8/2016 | Ziv | |
| 2016/0248170 | A1 | 8/2016 | Bisiules et al. | |
| 2016/0285169 | A1 | 9/2016 | Shooshtari et al. | |
| 2016/0365641 | A1 | 12/2016 | Mayer et al. | |
| 2017/0222306 | A1 * | 8/2017 | Biscontini | H01Q 21/26 |
| 2018/0097293 | A1 | 4/2018 | Piegsa et al. | |
| 2018/0337462 | A1 * | 11/2018 | Vollmer | H01Q 9/16 |
| 2019/0173186 | A1 * | 6/2019 | Farzaneh | H01Q 21/26 |
| 2020/0067205 | A1 * | 2/2020 | Segador Alvarez | H01Q 21/26 |
| 2020/0106195 | A1 | 4/2020 | Fleancu et al. | |
| 2020/0212598 | A1 * | 7/2020 | Gonzalez | H01Q 25/001 |
| 2020/0373671 | A1 * | 11/2020 | Li | H01Q 19/108 |
| 2020/0412011 | A1 | 12/2020 | Bisiules et al. | |
| 2021/0203085 | A1 | 7/2021 | Jordan et al. | |
| 2021/0257744 | A1 | 8/2021 | Karlsson et al. | |
| 2021/0305718 | A1 | 9/2021 | Li et al. | |
| 2021/0305721 | A1 | 9/2021 | Li et al. | |
| 2021/0359395 | A1 * | 11/2021 | Kasani | H01Q 21/0075 |
| 2022/0181795 | A1 * | 6/2022 | Varnoosfaderani | H01Q 25/001 |
| 2022/0190470 | A1 * | 6/2022 | Wu | H01Q 1/521 |
| 2022/0200168 | A1 * | 6/2022 | Fleancu | H01Q 5/42 |
| 2022/0216583 | A1 * | 7/2022 | Yang | H01Q 1/246 |
| 2022/0376407 | A1 * | 11/2022 | Liu | H01Q 5/42 |
| 2023/0017375 | A1 * | 1/2023 | Wu | H01Q 5/42 |
| 2024/0006744 | A1 * | 1/2024 | Wu | H01Q 25/00 |
| 2024/0006777 | A1 * | 1/2024 | Li | H01Q 9/16 |
| 2024/0322456 | A1 * | 9/2024 | Vladimir | H01Q 1/50 |
| 2025/0038398 | A1 * | 1/2025 | Li | H01Q 1/246 |

FOREIGN PATENT DOCUMENTS

| | | | | | |
|---|---|---|---|---|---|
| CN | 203071223 | U | | 7/2013 | |
| CN | 103339798 | A | | 10/2013 | |
| CN | 109690871 | A | * | 4/2019 | H01Q 1/246 |
| CN | 111541010 | A | * | 8/2020 | H01Q 1/246 |
| CN | 118412640 | A | * | 7/2024 | |
| GB | 2517735 | A | | 3/2015 | |
| KR | 101517474 | B1 | * | 5/2015 | |
| WO | WO-2022203856 | A1 | * | 9/2022 | |
| WO | WO-2023154593 | A1 | * | 8/2023 | |
| WO | WO-2025020757 | A1 | * | 1/2025 | |

OTHER PUBLICATIONS

Chinese Office Action corresponding to Chinese Application No. 201880003998.7 (Foreign Text, 10 pages; English Translation, 8 pages) (Aug. 12, 2020).

Notification of Transmittal of the International Search Report and the Written Opinion of the International Searching Authority, or the Declaration, in corresponding PCT Application No. PCT/US2018/039954 (Oct. 1, 2018).

* cited by examiner

ULTRA-WIDE BANDWIDTH LOW-BAND RADIATING ELEMENTS

CLAIM OF PRIORITY

The present application is a divisional of and claims priority to U.S. patent application Ser. No. 16/343,587, filed on Apr. 19, 2019, which is a 35 U.S.C. § 371 national stage application of PCT Application No. PCT/US2018/039954, filed on Jun. 28, 2018, which itself claims the benefit of and priority under 35 U.S.C. § 119 to U.S. Patent Application No. 62/529,578, filed on Jul. 7, 2017, the entire contents of which are incorporated by reference herein in their entireties. The above-referenced PCT Application was published in the English language as International Publication No. WO 2019/010051 A1 on Jan. 10, 2019.

FIELD

The present disclosure generally relates to communications systems and, more particularly, to array antennas utilized in communications systems.

BACKGROUND

Antennas for wireless voice and/or data communications typically include an array of radiating elements connected by one or more feed networks. Multi-band antennas can include multiple arrays of radiating elements with different operating frequencies. For example, common frequency bands for GSM services include GSM900 and GSM1800. A low-band of frequencies in a multi-band antenna may include a GSM900 band, which operates at 880-960 MHz. The low-band may also include Digital Dividend spectrum, which operates at 790-862 MHz. Further, the low-band may also cover the 700 MHz, spectrum at 694-793 MHz. A high-band of a multi-band antenna may include a GSM1800 band, which operates in the frequency range of 1710-1880 MHz. A high-band may also include, for example, the UMTS band, which operates at 1920-2170 MHz. Additional bands included in the high-band may include LTE2.6, which operates at 2.5-2.7 GHz and WiMax, which operates at 3.4-3.8 GHz.

For effluent transmission and reception of Radio Frequency (RF) signals, the dimensions of radiating elements are typically matched to the wavelength of the intended band of operation. A dipole antenna may be employed as a radiating element, and may be designed such that its first resonant, frequency is in the desired frequency band. To achieve this, each of the dipole arms may be about one quarter wavelength, and the two dipole arms together away be about one half the wavelength of the center frequency of the desired frequency band. These are referred to as "half-wave" dipoles, and may have relatively low impedance.

Dual-band antennas have been developed which include different radiating elements having dimensions specific to each of the two bands, e.g., respective radiating elements dimensioned for operation, over a low band of 698-960 MHz and a high band of 1710-2700 MHz. See, for example, U.S. Pat. Nos. 6,295,028, 6,333,720, 7,238,101 and 7,405,710, the disclosures of which are incorporated by reference herein. Because the wavelength of the GSM 900 band (e.g., 880-960 MHz) is longer than the wavelength of the GSM 1800 band (e.g., 1710-1880 MHz), the radiating elements dimensioned or otherwise designed for one band are typically not used for the other band.

Multi-band antennas may involve implementation difficulties, for example, due to interference among the radiating elements for the different bands, in particular, the radiation patterns for a lower frequency band can be distorted by resonances that develop in radiating elements that are designed to radiate at a higher frequency band, typically 2 to 3 times higher in frequency. For example, the GSM1800 band is approximately twice the frequency of the GSM900 band. As such, the introduction of additional radiating elements having an operating frequency range different from the existing radiating elements in the antenna may cause distortion with the existing radiating elements.

Examples of such distortion include Common Mode resonance and Differential Mode resonance. Common Mode (CM) resonance can occur when the entire higher band radiating structure resonates as if it were a one quarter wave monopole. Wavelength is inversely proportional to frequency. The stalk or vertical structure of the radiating element is often one quarter wavelength long at the higher band frequency, and the dipole arms are also often one quarter wavelength long at the higher band frequency. Where the higher band is about double the frequency of the lower band, the total high-band structure may be roughly one quarter wavelength long at a lower band frequency. Differential mode resonance may occur when each half of the dipole structure, or two halves of orthogonally-polarized higher frequency radiating elements, resonate against one another.

SUMMARY

According to some embodiments of the present disclosure, a dipole antenna includes a reflector, a radiating element, and a feed element on the radiating element opposite the reflector. The radiating element includes first and second dipoles on a surface of the reflector. The first and second dipoles respectively include arm segments and are arranged in a crossed dipole arrangement. The feed element includes first and second conductive transmission lines that are electrically isolated from one another and are capacitively coupled to the arm segments of the first and second dipoles, respectively. The arm segments of the first and second dipoles are between the feed element and the surface of the reflector.

In some embodiments, the feed element may laterally extend along surfaces of the arm segments that are opposite the surface of the reflector, and may include a dielectric layer between the first and second conductive transmission lines and the surfaces of the arm segments.

In some embodiments, the feed element may be a printed circuit board including the first and second conductive transmission lines thereon.

In some embodiments, the surfaces of the arm segments may be substantially planar.

In some embodiments, the arm segments of the first dipole may be capacitively coupled to the arm segments of the second dipole by respective coupling regions therebetween.

In some embodiments, the arm segments of the first and second dipoles may further include portions at edges of the surfaces thereof that extend toward the reflector, and the respective coupling regions may be defined by the portions of the arm segments.

In some embodiments, the arm segments of the first and second dipoles may be sheet metal, the surfaces of the arm segments may collectively define a rectangular shape in plan view, and the portions at the edges of the surfaces thereof may include bent portions of the sheet metal.

In some embodiments, the first conductive transmission line may extend further along the surface of one of the arm segments of the first dipole than along, the surface of another of the arm segments thereof, and the second conductive transmission line may extend further along the surface of one of the arm segments of the second dipole than along the surface of another of the arm segments thereof.

In some embodiments, the first and second conductive transmission lines may extend substantially equal distances along the surface of the one of the arm segments of the first and second dipoles, respectively.

In some embodiments, the first and second conductive transmission lines may extend in substantially perpendicular directions along the surface of the feed element.

In some embodiments, one of the first and second conductive transmission lines may include portions on different layers of the printed circuit hoard that are electrically connected by plated through-hole vias.

In some embodiments, first and second coaxial feed cables may respectively include an inner conductor and an outer conductor extending from the surface of the reflector to the feed element. The inner conductors of the first and second coaxial feed cables may be electrically connected to the first and second conductive transmission lines, respectively, and the outer conductors of the first and second coaxial feed cables may be electrically grounded.

In some embodiments, one of the arm segments of the first dipole and one of the arm segments of the second dipole may include respective openings therein that are sized to permit the inner, conductors of the first and second coaxial feed cable to extend therethrough, respectively.

In some embodiments, the feed element may include a conductive ground plane, and the outer conductors of the first and second coaxial feed cables may be electrically grounded to the conductive ground plane of the feed element.

In some embodiments, portions of the feed element that do not extend along surfaces of the arm segments may be free of the conductive ground plane.

In some embodiments, the outer conductors of the first and second coaxial feed cables may be electrically grounded to the arm segments of the first and second dipoles, respectively.

In some embodiments, at least one feed stalk may extend from the reflector towards the first and second dipoles. The first and second coaxial feed cables may extend along the at least one feed stalk beyond the first and second dipoles.

In some embodiments, the first and second conductive transmission lines may respectively define a linear shape, or a non-linear shape, such as a hook shape, and/or portions of differing width.

In some embodiments, the first conductive transmission line may be connected to a first antenna port of the dipole antenna, and the second conductive transmission line may be connected to a second antenna port of the dipole antenna.

According to some embodiments of the present disclosure, a dipole antenna includes a reflector, a radiating element, and a feed element. The radiating element includes first and second dipoles above a surface of the reflector. The first and second dipoles are arranged in a crossed dipole arrangement and respectively include arm segments having substantially planar surfaces that collectively define a rectangular shape in plan view. The arm segments of the first dipole are capacitively coupled to the arm segments of the second dipole by respective coupling regions therebetween. The feed element includes first and second conductive transmission lines that are electrically isolated from one another and arc capacitively coupled to the arm segments of the first and second dipoles, respectively. The feed element laterally extends above and along the substantially planar surfaces of the arm segments opposite the surface of the reflector and includes a dielectric layer that is between the first and second conductive transmission lines and the surfaces of the arm segments.

In some embodiments, the feed element may be a printed circuit board, the arm segments of the first and second dipoles may be sheet metal, and the respective coupling regions may be portions of the arm segments at edges of the substantially planar surfaces thereof that are bent to extend toward the reflector.

Further features, advantages and details of the present disclosure, including any and all combinations of the above embodiments, will be appreciated by those of ordinary skill in the art from a reading of the figures and the detailed description of the embodiments that follow, such description being merely illustrative of the present disclosure.

DETAILED DESCRIPTION OF EMBODIMENTS

Figure 1:
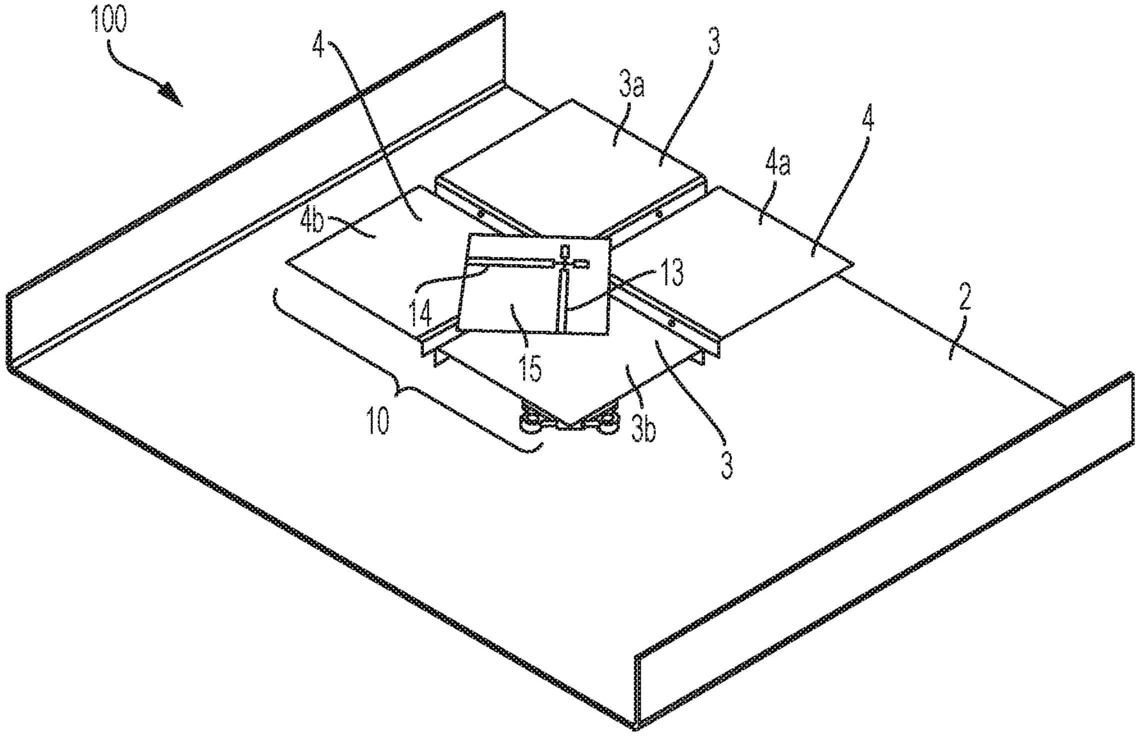
FIG. 1 is a perspective view of a dipole antenna including a wideband low-band radiating element in accordance with some embodiments of the present disclosure.

Embodiments described herein relate generally to radiating elements (also referred to herein as "radiators") for use in single-band or broadband/multi-band cellular base station antenna (BSA) and single-band or multi-band cellular base-station antennas including such radiating elements. Multi-brad antennas can enable operators of cellular systems ("wireless operators") to use a single type of antenna covering multiple bands, where multiple antennas were previously required. Such antennas are capable of supporting several major air-interface standards in almost all the assigned cellular frequency bands and allow wireless operators to reduce the number of antennas in their networks, lowering tower leasing costs, installation costs, and reducing the load on the tower.

As used hereinafter, "low-band" may refer to a lower operating frequency band for radiating elements described herein (e.g., 694-960 MHz), "high-band" may refer to a higher operating frequency band for radiating elements described herein (e.g., 1695-2690 MHz), and "wideband low-band" may refer to a wider operating frequency band that may partially or fully overlap with the low-band for radiating elements described herein (e.g., 554-960 MHz). A "low-band radiating element" may refer to a radiating element for such, a lower frequency band, a "high-band radiating element" may refer to a radiating element for such a higher frequency band, and a "wideband low-band radiating element" may refer to a radiating element for such a wider low frequency band (and may also be referred to herein as an "ultra-wide bandwidth low-band radiating element"). "Dual-band" or "multi-band" as used herein may refer to arrays including both low-band and high-band radiating elements. Characteristics of interest may include the beam width and shape and the return loss. "Conductive" as described herein refers to electrical conductivity.

A challenge in the design of dual- or multi-band antennas is reducing or minimizing the effects of scattering of the signal at one band by the radiating elements of the other band(s). This scattering can affect the shapes of the high-band beam in both azimuth and elevation cuts and may vary greatly with frequency, in azimuth, typically the beamwidth, beam shape, pointing angle gain, and front-to-back ratio (FBR) can all be affected and can vary with frequency, often in an undesirable way. Because of the periodicity in the array introduced by the low-band radiating elements, grating lobes (sometimes referred to as quantization lobes) may be introduced into the elevation pattern at angles corresponding to the periodicity. This may also vary with frequency and may reduce gain. With narrow band radiating elements, the effects of this scattering can be compensated to some extent in various ways, such as adjusting beamwidth by offsetting the high-band radiating elements in opposite directions or adding directors to the high-band radiating elements. Where wideband coverage is required, correcting these effects may be particularly difficult.

Some embodiments described herein may relate more specifically to antennas with interspersed radiating elements for cellular base station use. In an interspersed design, the low-band and/or wideband low-band radiating elements may be arranged or located on an equally-spaced grid appropriate to the frequency. The low-band and/or wideband low-band radiating elements may be placed at intervals that are an integral number of high-band radiating elements intervals (often two such intervals), and the low-band and/or wideband low-band radiating elements may occupy gaps between the high-band radiating elements. The low-band, wideband low-band, and/or high-band radiating elements may be dual-polarized, e.g., vertically and horizontally polarized, or dual-slant polarized, e.g., with +/−45 degree slant polarizations. Two polarizations may be used, for example, to overcome multipath fading by polarization diversity reception. Examples of some conventional BSAs that include a crossed dipole antenna element are described in U.S. Pat. No. 7,053,852.

In some conventional multi-band, antennas, the radiating elements of the different bands of elements are combined on a single panel. See, e.g., U.S. Pat. No. 7,283,101, FIG. 12; U.S. Pat. No. 7,405,710, FIG. 1, FIG. 7. In these dual-band antennas, the radiating elements are typically aligned along a single vertically-oriented axis. This may be done to reduce the width of the antenna when going from a single-band to a dual-band antenna. Low-band elements are typically the largest elements, and typically require the most physical space on a panel antenna. The radiating elements may be spaced further apart to reduce coupling, but this increases the size of the antenna and may produce grating lobes. An increase in panel antenna size may have undesirable drawbacks. For example, a wider antenna may not fit in an existing location, or the tower may not have been designed to accommodate the extra wind loading of a wider antenna. Also, zoning regulations can prevent the use of bigger antennas in some areas.

Some embodiments described herein are directed to ultra wide bandwidth (554-960 MHz) low-band radiating elements that can provide broadband performance, while simultaneously reducing costs and/or complexity. In particular, such a wideband low-band radiating element may be excited by a hybrid feeding, mechanism including a combination of two transmission lines, which is configured to provide 554-960 MHz performance. The hybrid feeding mechanism may be implemented by a non-contacting reactive-coupled feed element, which may avoid direct metal-to-metal contact to provide improved passive intermodulation distortion (PIMD) values. In some embodiments, the dipole arm segments may be implemented by planar metal layers (for example, using rectangular sheet metal) to provide a low-cost solution. Wideband low-band radiating elements in accordance with some embodiments of the present disclosure may further provide stable radiation patterns with relatively smaller amounts of back emissions and cross polarization emissions.

Wideband low-band radiating elements and/or configurations as described herein may be implemented in multi-band antennas in combination with antennas and/or features such as those described in commonly-assigned U.S. patent application Ser. No. 14/683,424 filed Apr. 10, 2015, U.S. patent application Ser. No. 14/358,763 filed May 16, 2014, and/or U.S. patent application Ser. No. 13/827,190 filed Mar. 14, 2013, the disclosures of which are incorporated by reference. In some embodiments, the effects of the wideband low-band radiating elements on the radiation patterns of the high-band radiating elements, or vice versa, may be reduced or minimized. For example, some wideband low-band radiating elements as described herein (e.g., operating in a frequency range of about 554 MHz to about 960 MHz) may include or be coupled to one or more RF chokes that are resonant at or near the frequencies of the high-band, so as to provide cloaking with respect to high-band radiation (e.g., radiation having a frequency range of about 1695 MHz to about 2690 MHz). Such an arrangement may reduce or minimize interaction between wideband low-band and high-band radiating elements in a dual-polarization, dual-band cellular base station antenna.

FIG. 1 is a perspective view of a dipole antenna including a wideband low-band radiating element in accordance with some embodiments of the present disclosure. Referring to FIG. 1, a dual-polarized dipole antenna 100 includes a wideband low-hand radiating element 10 mounted on or in front of a base 2. The base 2 provides support for the wideband low-band radiating element 10. The base 2 further provides an electrical ground plane and back reflector for the wideband low-band radiating element 10. The base 2 may also include a feed network (not shown).

The wideband low-band radiating element 10 includes a first dipole 3 and a second dipole 4 in a crossed dipole arrangement. The first dipole 3 includes arm segments 3*a*, 3*b*, and the second dipole 4 includes arm segments 4*a*, 4*b*. In the example of FIG. 1, each of the arm segments 3*a*, 3*b*, 4*a*, and 4*b* is implemented by a planar metal layer, illustrated as a rectangular sheet metal layer. A feed element 15 includes a conductive transmission line 13 that couples to the opposing arm segments 3*a*, 3*b* of the first dipole 3, and includes a conductive transmission line 14 that couples to the opposing arm segments 4*a*, 4*b* of the second dipole 4. The feed element 15 may be implemented by a printed circuit board (PCB) structure with the transmission lines 13, 14 implemented by conductive traces in or on one or more layers of the PCB in some embodiments. The dipoles 3, 4 intersect at the center of the antenna 100, defining a crossed dipole configuration. While specific configurations of the dipoles 3, 4 are shown in FIG. 1, it will be understood that other dipole configurations may be implemented; for example, the dipoles 3, 4 may be implemented as bow-tie dipoles or other wideband dipoles in a crossed dipole arrangement.

Figure 2A:
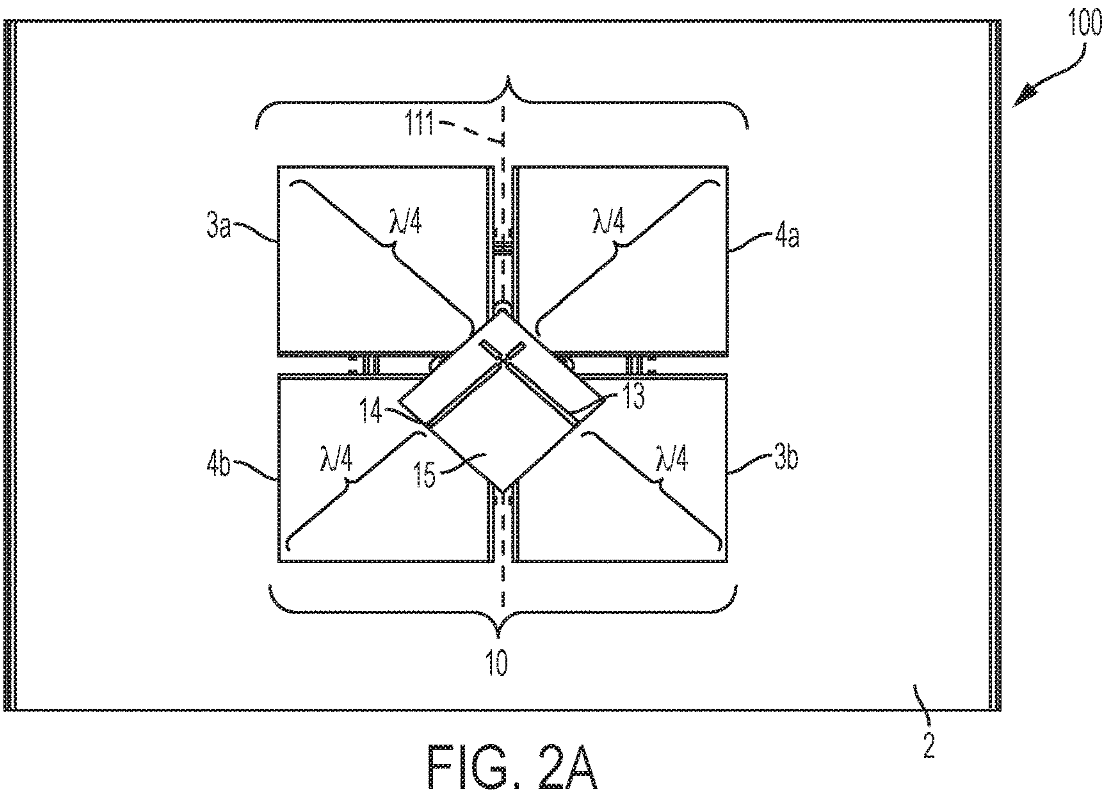
FIG. 2A is a plan view and FIG. 3A is a side view illustrating the dipole antenna of FIG. 1 in accordance with some embodiments of the present disclosure.
Figure 2B:
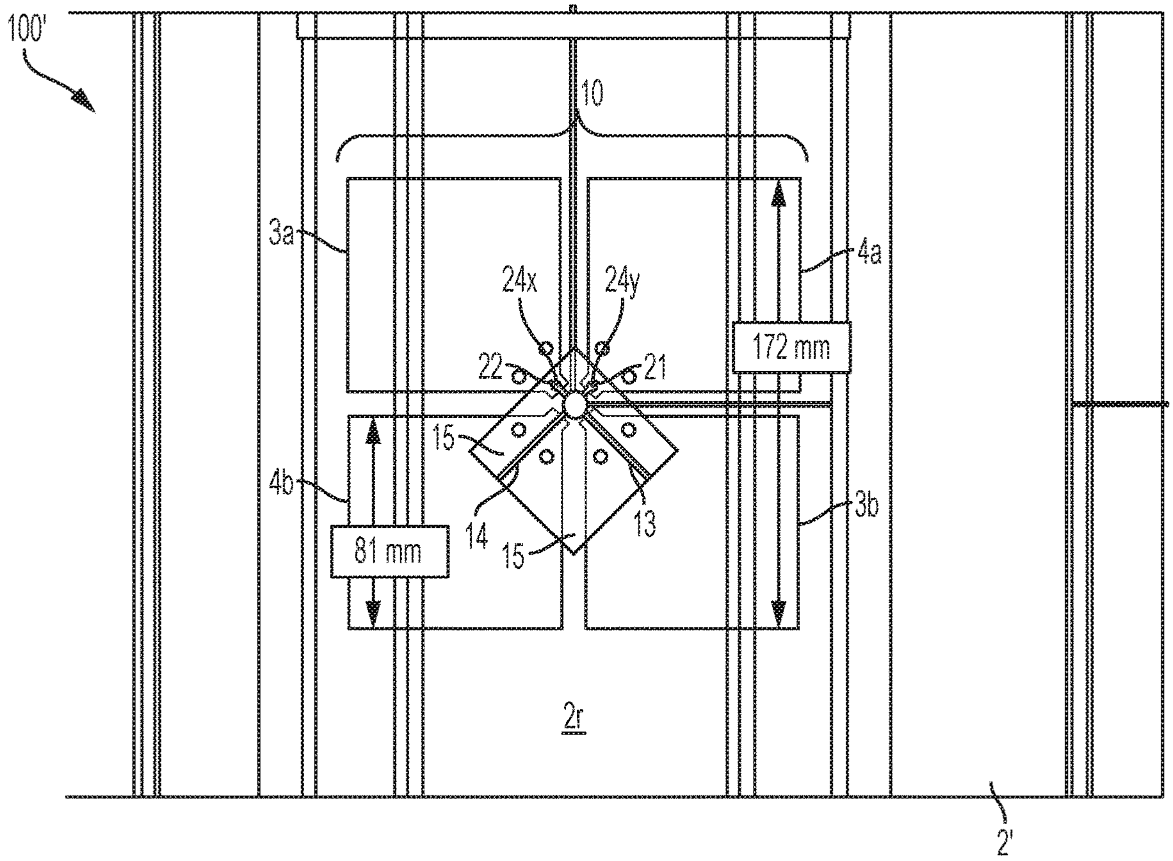
FIG. 2B is a plan view and FIG. 3B is a side view illustrating a dipole antenna in accordance with further embodiments of the present disclosure.
Figure 3A:
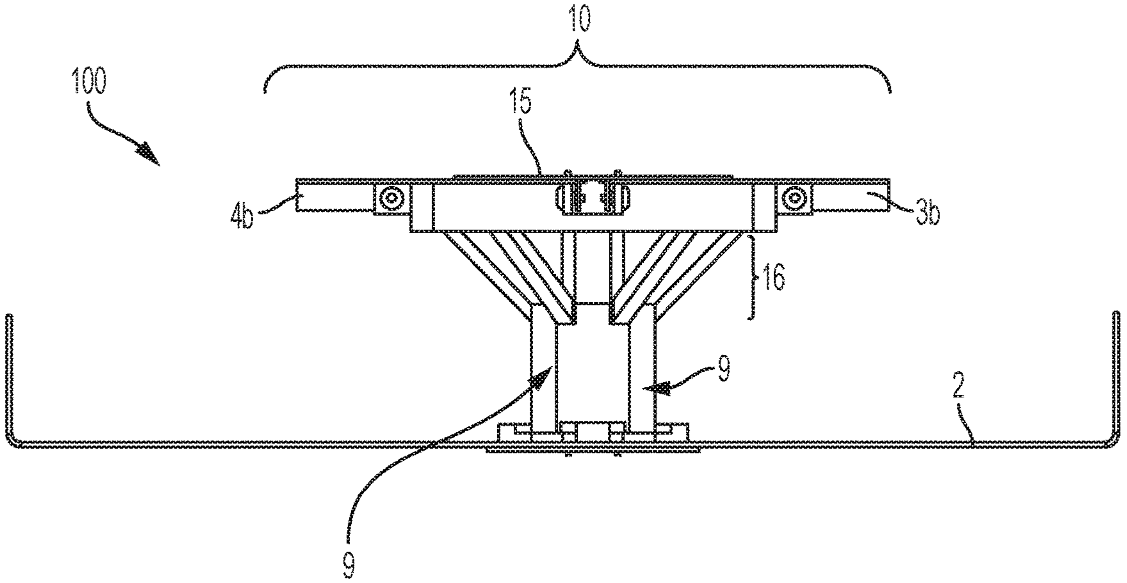
Figure 3B:
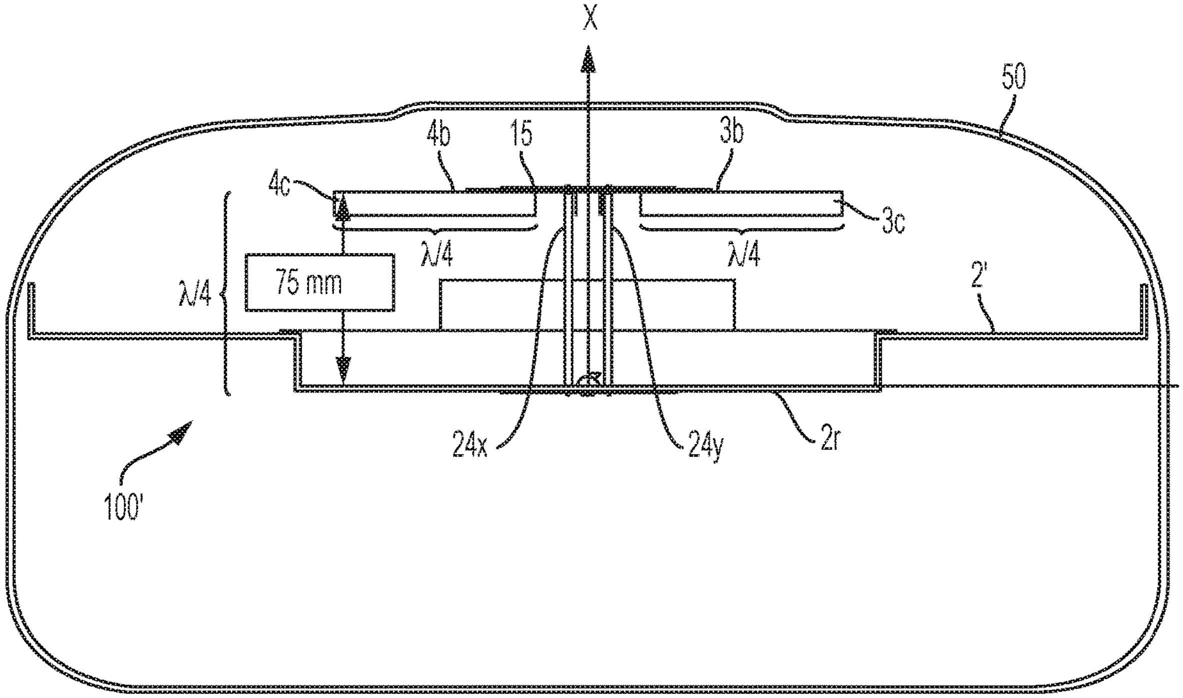

FIG. 2A is a plan view and FIG. 3A is a side view illustrating the dipole antenna 100 of FIG. 1, in which the base 2 (on which the wideband low-band radiating element 10 is mounted) is a substantially planar member. FIG. 2B is a plan view and FIG. 3B is a side view illustrating a dipole antenna 100' in accordance with further embodiments of the present disclosure, in which the base 2' has a stepped surface or opening therein that defines a conductive well or recess 2*r* on which the wideband low-band radiating element 10 is mounted.

As shown in FIGS. 2A and 2B, the wideband low-band radiating element 10 includes two half-wave (λ/2) dipoles 3, 4 that are arranged in a crossed-dipole arrangement and are configured to radiate orthogonal polarizations. The arm segments 3*a*, 3*b*, 4*a*, 4*b* of the dipoles 3, 4 define four quadrants, where the first dipole arm segments 3*a*, 3*b* are opposite one another, and the second dipole arm segments 4*a*, 4*b* are opposite one another. Each of the arm segments 3*a*, 3*b*, 4*a*, and 4*b* has a length of approximately a quarter wavelength (λ/4), with a capacitively coupled feed provided by the conductive transmission lines 13 and 14 of the feed element 15 that is positioned above the dipoles 3, 4, as described in greater detail herein.

In the examples described herein, the crossed dipoles 3, 4 are inclined at 45 degrees so as to radiate slant polarizations (linear polarizations inclined at −45 degrees and +45 degrees relative to a vertical or longitudinal antenna axis 111). In particular, the first dipole 3 is oriented at an angle of −45° to the antenna axis 111, and the second dipole 4 is oriented at an angle of +45° to the antenna axis 111. The first and second dipoles 3, 4 of the wideband low-band radiating element 10 may be fed by respective coaxial feed cables 24*x*, 24*y* and a hybrid feeding element 15 as described herein. In some embodiments, additional radiating elements may be located on clear or unobstructed areas on the base 2/2', such as high band radiating elements in a multiband antenna.

As shown in FIG. 3A, multiple legs 9 (illustrated as plastic supports) and a support structure 16 suspend or support the wideband low band radiating element 10 over the base 2 and 2', respectively. The arm segments 3*a*, 3*b*, and 4*a*, 4*b* of the dipoles 3, 4 are thus positioned between the reflector surface provided by the base 2/2' and the feed element 15. For example, in some embodiments, each leg 9 may extend from the reflector defined by the base 2/2' to support one or more of the arm segments 3*a*, 3*b*, 4*a*, 4*b*. The legs 9 may be implemented by a printed circuit board (PCB) structure in some embodiments. One or more of the legs 9 may be feed stalks along, which conductive feed lines may extend. The conductive feed lines may be transmission lines that carry RF signals between a feed network on the base 2/2' and the wideband low-band radiating element 10.

In some embodiments, the teed lines may be provided by respective coaxial feed cables 24*x*, 24*y* that extend along the feed stalks defined by the legs 9, from the surface of the base 2/2' beyond the first and second dipoles 3, 4 and towards the feed element 15. In some embodiments, arm segments 3*a* and 4*a* of the dipoles 3 and 4 include openings 22 and 21, through which the conductive transmission lines 13 and 14 on the feed element 15 may be connected to respective inner conductors of the coaxial feed cables 24*x*, 24*y*. As such, each dipole 3, 4 is provided in a center-fed arrangement. The legs 9 may also include respective baluns which are connected to the feed lines provided by the coaxial feed cables 24*x*, 24*y*.

The two dipoles 3, 4 may be proximity fed by the conductive transmission lines 13, 14 of the feed element 15 to radiate electrically in two polarization planes simultaneously. The wideband low-band radiating element 10 is configured to operate at a wide low-band frequency range of 554-960 MHz, although the arrangements as described herein can be used to operate in other frequency ranges. The proximity-fed arrangement (in which the conductive transmission lines 13, 14 are spaced apart from the dipoles 3, 4 so that they field-couple with the dipoles 3, 4) may result in a wider operating bandwidth compared with a conventional direct-fed antenna (in which the dipoles are physically connected to the feed probe by a solder joint). Also the lack of solder joints resulting from the proximity-fed arrangement may result in less risk of passive intermodulation distortion and lower manufacturing costs compared with a conventional direct-fed antenna. Placing baluns on opposite sides of the dipoles 3, 4 may also improve isolation, between the two polarizations.

As noted above, in the embodiments of FIGS. 2B and 3B, the base 2' includes a stepped surface 2*r* defining a well or "moat" around the structure of the wideband low-band radiating element 10, as also described for example in U.S. patent application Ser. No. 14/479,102, the disclosure of which is incorporated by reference. The well or recessed surface 2*r* allows the feed stalks 9 to suspend the arms of the dipoles 3, 4 at a desired distance or height above the surface of the recess 2*r*. The distance between the dipole arms 3*a*, 3*b*, 4*a*, and 4*b* and the reflector provided by the recessed surface 2*r* may aid in radiation pattern shaping, and may assist in avoiding interference with other bands when used in a multi-band antenna array. In some embodiments, the coaxial feed cables 24$x$, 24$y$ may extend along the feed stalks 9 to suspend the dipoles 3, 4 above the recessed surface 2$r$ by approximately one quarter wavelength (illustrated by way of example as 75 millimeters in FIG. 3B). The recessed surface 2$r$ of the base 2' can thereby allow for a reduction in the overall height of the antenna 100' (and thus the height of the enclosure 50 in which the antenna 100' is housed), while at the same time achieving a desired radiation pattern and/or avoiding interference.

The coaxial feed cables 24$x$, 24$y$ also include respective outer conductors that are electrically grounded. In some embodiments, the outer conductors of the coaxial feed cables 24$x$, 24$y$ may be grounded to one of the arm segments of each of the dipoles 3, 4, for example, where the arm segments 3$a$, 4$a$ are implemented by sheet metal portions. In other embodiments, the outer conductors of the coaxial feed cables 24$x$, 24$y$ may be grounded to portions of a conductive ground plane of the feed element 15, as described in greater detail below with reference to the embodiments of FIGS. 5A and 5B. In some embodiments, gaps in the outer conductors of the coaxial feed cables 24$x$, 24$y$ (near the approximately quarter wavelength sections that extend along the feed stalks 9) may function as coaxial chokes.

Figure 4A:
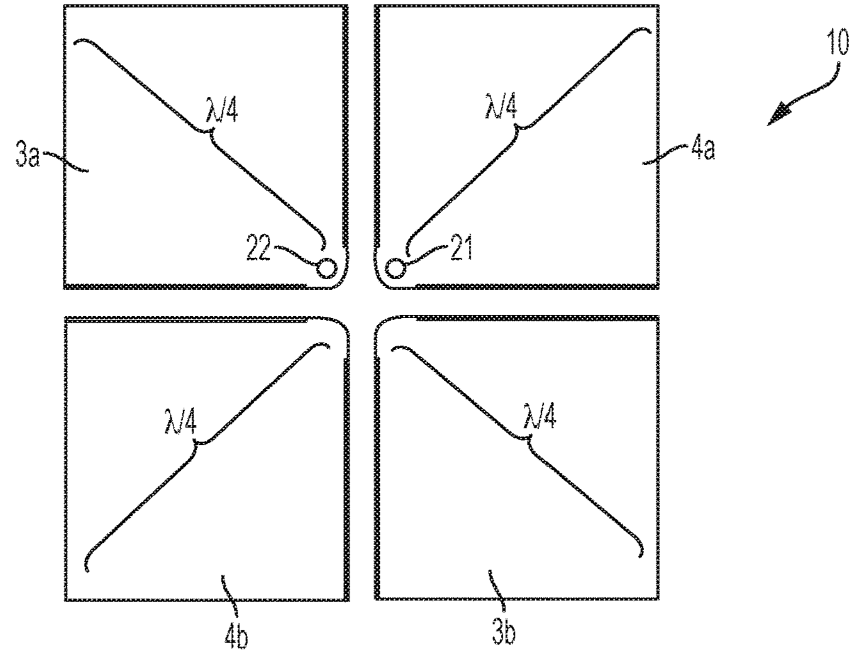
FIG. 4A is a plan view illustrating first and second dipoles in a crossed dipole arrangement of the radiating element of the dipole antenna of FIG. 1 in accordance with some embodiments of the present disclosure.

FIG. 4A is a plan view illustrating the crossed, dipole arrangement of the first and second dipoles 3, 4 of the radiating element 10. As shown in FIG. 4A, the arm segments 3$a$, 3$b$, 4$a$, and 4$b$ of the dipoles 3, 4 are implemented by planar metal segments that define four quadrants. The dipoles 3, 4 are implemented using a relatively low-cost rectangular sheet metal design for the arm segments 3$a$, 3$b$, 4$a$, and 4$b$. Arm segments 3$a$ and 4$a$ include openings 22 and 21, through which the conductive transmission lines 13 and 14 on the feed element 15 may be connected to conductive feed lines 24$x$ and 24$y$ that carry RF signals between a feed network and the radiating element 10.

Figure 4B:
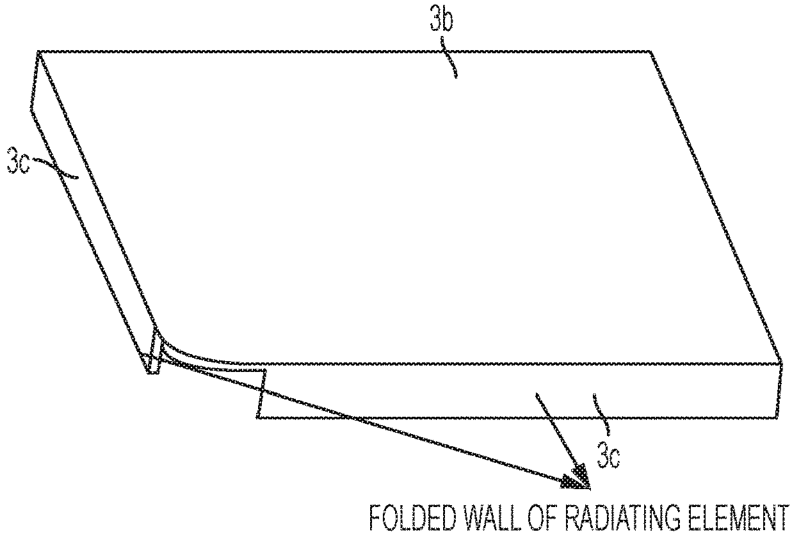
FIG. 4B is an enlarged perspective view illustrating an arm segment of one of the dipoles of FIG. 4A in accordance with some embodiments of the present disclosure.
Figure 4C:
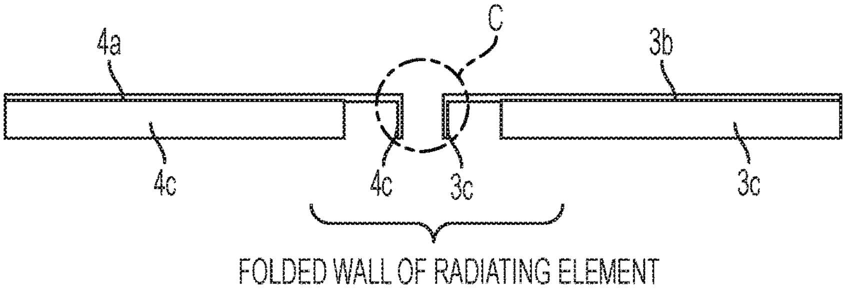
FIG. 4C is a side view illustrating the dipoles of FIG. 4A in accordance with some embodiments of the present disclosure.

The shape and/or geometry of the arm segments 3$a$, 3$b$, 4$a$, 4$b$ are configured to provide a wider operating bandwidth. In particular, FIG. 4B is an enlarged perspective view of arm segment 3$b$ of dipole 3, while FIG. 4C is a side view of the arm segments 3$b$ and 4$a$ of the dipoles 3 and 4. As shown in FIGS. 4B and 4C, the arm segments 3$b$ and 4$a$ include portions 3$c$ and 4$c$ that extend toward the surface of the base or reflector 2/2' (not shown). In the sheet metal implementation shown in FIGS. 4A-4C, each arm segment 3$a$, 3$b$, 4$a$, 4$b$ includes portions 3$c$ or 4$c$ that are bent at edges thereof, to define "folded walls" that extend towards the base or reflector 2/2'. When arranged in the crossed-dipole arrangement shown in FIG. 4A, the bent or folded wall, portions 3$c$, 4$c$ define respective plate capacitors between adjacent arm segments 3$a$, 3$b$, 4$a$, 4$b$. More particularly, each of the arm segments 3$a$ and 3$b$ of dipole 3 is capacitively coupled to each of the arm segments 4$a$ and 4$b$ of dipole 4 by respective coupling regions C defined by the adjacent portions 3$c$ and 4$c$ thereof. That is, the adjacent portions 3$c$, 4$c$ of the arm segments 3$a$, 3$b$, 4$a$, 4$b$ provide coupling regions C between the dipoles 3, 4 of different or opposite polarizations, which may aid in achieving a desired wider operating bandwidth (e.g., 554-960 MHz). In some embodiments, the length of the portions 3$c$, 4$c$ that are bent or otherwise extend toward the surface of the base/reflector may be increased relative to the planar portions 3$a$, 3$b$, 4$a$, 4$b$, which may reduce the overall dimensions of the dipoles 3, 4 while retaining wideband low-band performance.

Figure 5A:
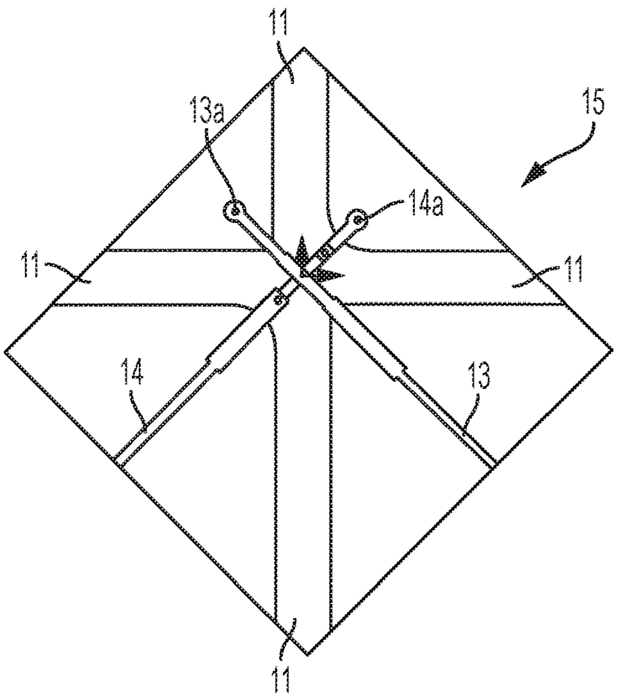
FIG. 5A is a plan view illustrating the feed element of the dipole antenna of FIG. 1 in accordance with some embodiments of the present disclosure.
Figure 5B:
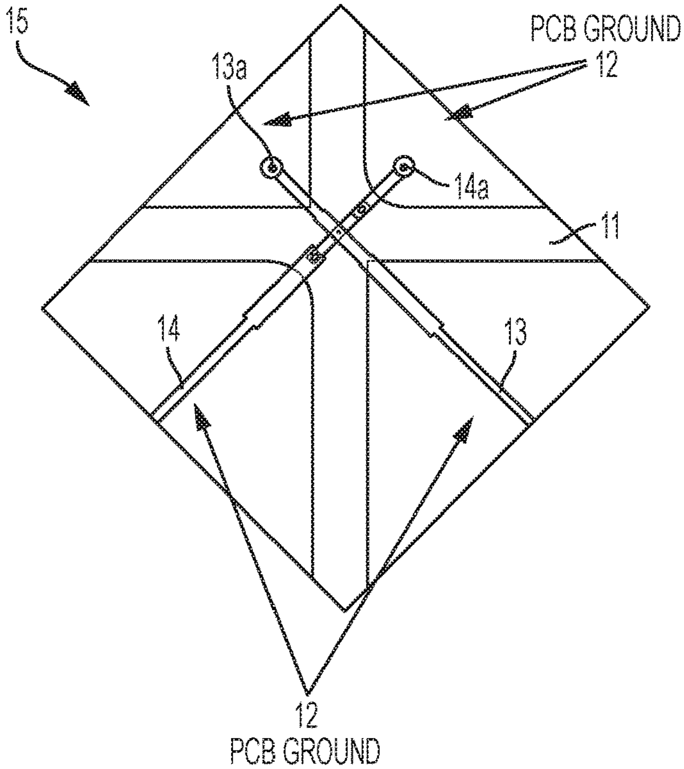
FIG. 5B is a plan view illustrating a layer of the feed element of FIG. 5A in accordance with some embodiments of the present disclosure.
Figure 6A:
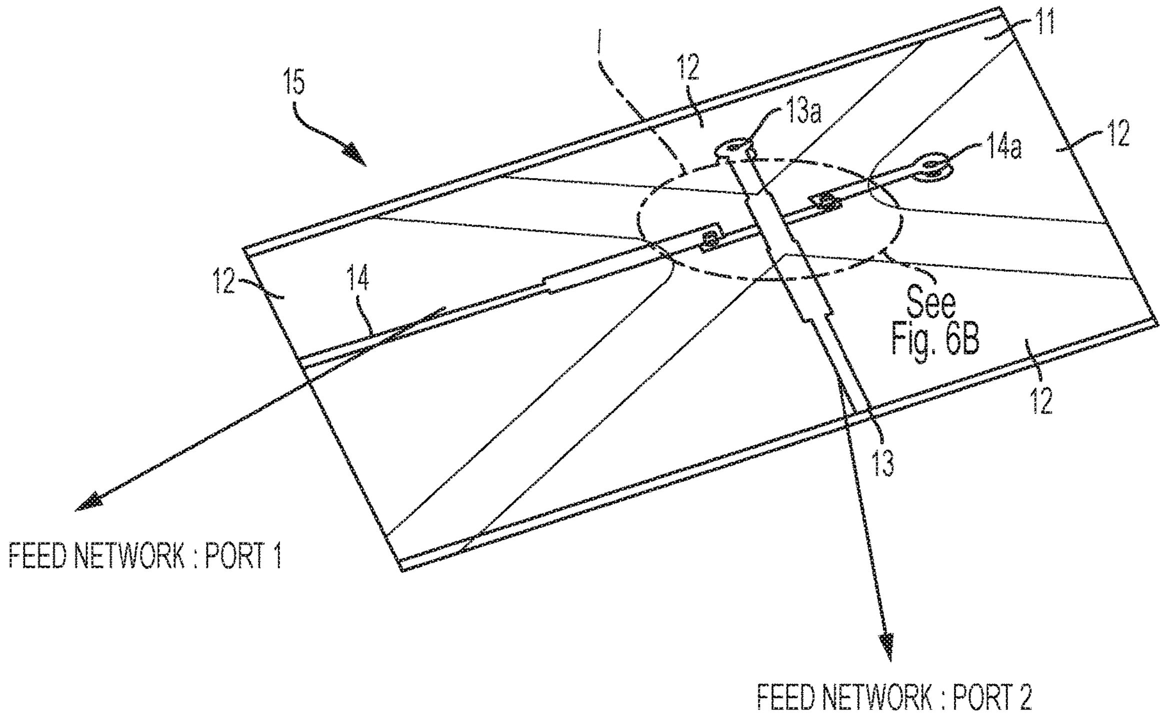
FIG. 6A is a perspective view illustrating the feed element of the dipole antenna of FIG. 1 in accordance with some embodiments of the present disclosure.
Figure 6B:
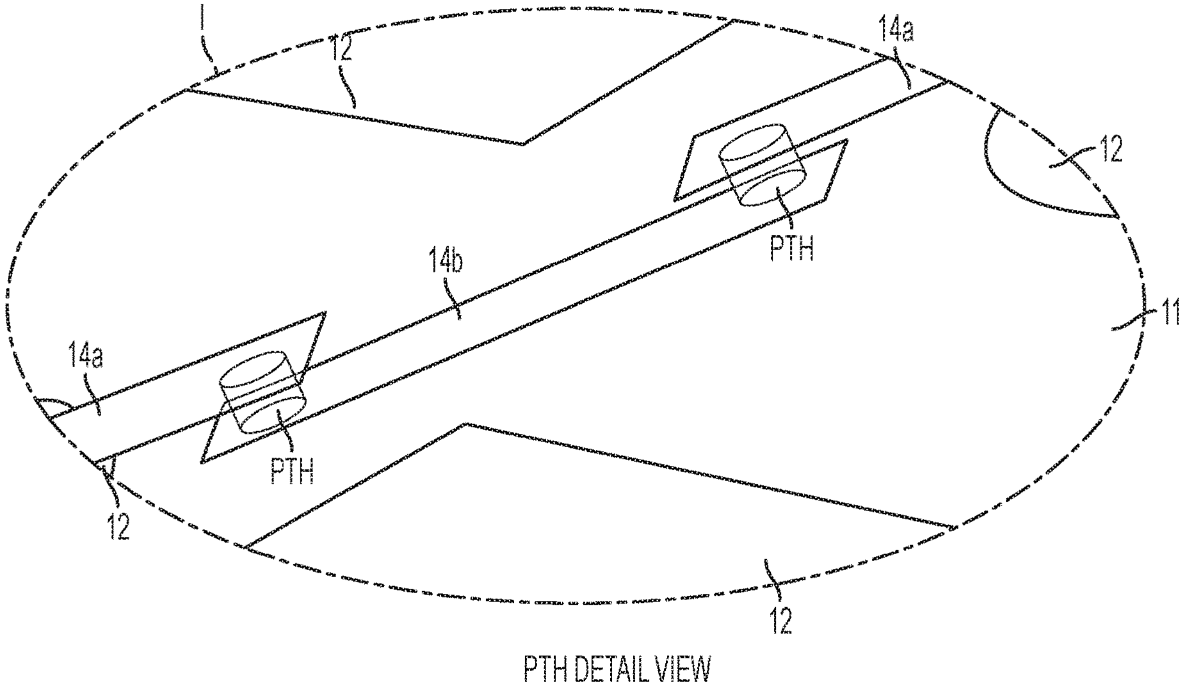
FIG. 6B is an enlarged perspective view illustrating a portion of the feed element of FIG. 6A in accordance with some embodiments of the present disclosure.

FIGS. 5A, 5B, 6A, and 6B illustrate the feed element 15 in greater detail. In particular, FIG. 5A is a plan view of the feed element 15, FIG. 5B is a plan view illustrating a sublayer of the feed element 15, FIG. 6A is a perspective view illustrating the feed element 15, and FIG. 6B is an enlarged perspective view illustrating a portion I of the feed element 15 in which the conductive traces 13 and 14 intersect.

As shown in FIGS. 5A, 5B, 6A, and 6B, the feed element 15 is implemented as a printed circuit board (PCB) including electrically isolated conductive traces that define transmission lines 13 and 14. The feed element 15 laterally extends along surfaces of the dipole arm segments 3$a$, 4$a$, 3$b$, and 4$b$ that are opposite the surface of the base/reflector 2/2' on which the radiating element 10 is mounted. In embodiments where the arm segments 3$a$, 4$a$, 3$b$, 4$b$ are implemented by planar metal layers, the feed element 15 may laterally extend in parallel with the surfaces of the arm segments 3$a$, 4$a$, 3$b$, 4$b$. The conductive transmission lines 13 and 14 thus extend, over the arm segments 3$a$/3$b$ and 4$a$/4$b$, and the dielectric layer of the PCB forming the feed element 15 provides a dielectric layer that extends between and separates the conductive transmission lines 13 and 14 from the arm segments 3$a$/3$b$ and 4$a$/4$b$. The conductive transmission lines 13 and 14 are connected to respective feed lines, for example as provided by the respective inner conductors of coaxial feed cables 24$x$, 24$y$, which may be electrically connected to the conductive transmission lines 13 and 14 at portions 13$a$ and 14$a$ through openings 22 and 21 in arm segments 3$a$ and 4$a$, respectively. The conductive transmission lines 13 and 14 may provide respective antenna ports for connection to the feed network on the base 2/2'. For example, conductive transmission line 14 may be connected to antenna port 1 of the feed network, while conductive transmission, line 13 may be connected to antenna port 2 of the feed network. The feed element 15 thereby provides a non-contact capacitively coupled feed to excite radiating element 10. Such a non-contact feed mechanism may allow for a wider operating bandwidth in some embodiments, In the examples of FIGS. 5A, 5B, 6A, and 6B, the conductive transmission lines 13 and 14 are electrically isolated from one another using plated through holes PTH for connections between portions of the lines 13, 14 on different layers of the PCB feed element 15. In particular, as shown in greater detail in FIG. 6B, conductive transmission line 14 may include portions or segments 14$a$ on one level or layer of the PCB feed element structure 15, and a portion or segment 14$b$ on a different layer of the PCB feed element structure 15. Plated through holes PTH electrically connect the portions or segments 14$a$ and 14$b$ on the different layers of the PCB 15. This implementation of conductive transmission line 14 may allow conductive transmission line 13 to intersect or cross thereover, while maintaining electrical isolation between the transmission lines 13 and 14.

The conductive transmission lines 13, 14 may asymmetrically extend along (or "overlap") with one of the arm segments 3$a$, 4$a$ in comparison to the other arm segments 3$b$, 4$b$, of each dipole 3, 4, for example, to provide impedance matching. In particular, as shown in the examples described herein, the conductive transmission line 13 overlaps to a greater extent with dipole arm segment 3$b$ than with dipole arm segment 3$a$, while the conductive transmission line 14 overlaps to a greater extent with dipole arm segment 4$b$ than with dipole arm segment 4$a$. That is, the lengths of the portions of the conductive transmission lines 13 and 14 that extend along dipole arm segments 3$b$ and 4$b$ may be greater than the lengths of the portions of the conductive transmission lines 13 and 14 that extend along dipole arm segments 3$a$ and 4$a$ (or vice versa). The conductive transmission lines 13 and 14 also extend equally along the surfaces of the arm segments 3*b* and 4*b*, for example, to provide a hybrid feed element in the form of an equal-split coupler.

In some embodiments, impedance matching requirements may impose limitations on the widths of the conductive transmission lines, and as such, the lengths and/or shapes of the conductive transmission lines 13, 14 may be adjusted to provide the desired coupling. For example, the conductive transmission lines 13, 14 may respectively define a linear shape, a non-linear shape, such as a hook shape or meandering shape, and/or may include portions of differing width. The conductive transmission lines 13, 14 may be implemented as microstrip transmission lines in some embodiments.

As shown in FIG. 5B, in some embodiments, the feed element 15 may be implemented by a PCB structure that includes conductive ground planes 12 at one or more layers thereof. For example, the conductive ground planes 12 may be provided on a bottom or lower layer(s) of the feed element 15 (e.g., layers of the feed element 15 proximate the surface of the base 2/2'), while the, conductive traces 13 and 14 (including portions 14*a* and 14*b* thereof) may be provided on a top or upper layers of the feed element 15 (e.g., layers of the feed element 15 distal from the surface of the base 2/2'). The respective outer conductors of the coaxial feed cables 24*x*, 24*y* may thereby be electrically grounded to the ground planes 12 of the feed element 15 in some embodiments. FIG. 5B further illustrates that the ground plane portions 12 are confined within (or "match") the shapes of the arm segments 3*a*, 3*b*, 4*a*, 4*b* over which corresponding portions of the feed element 15 overlap in plan view. That is, portions of the feed element 15 that do not extend along surfaces of the arm segments 3*a*, 3*b*, 4*a*, 4*b* (but rather, extend over the gaps between adjacent dipole arm segments 3*a*, 3*b*, 4*a*, 4*b*) are free of conductive ground plane portions 12. Reference designator 11 illustrates the portions of the feed element 15 that extend between or otherwise do not overlap with surfaces of the arm segments 3*a*, 3*b*, 4*a*, 4*b* of the dipoles 3, 4 (as shown in the plan view) do not include the conductive ground plane 12. Confining the ground plane portions 12 to areas that overlap with the arm segments 3*a*, 3*b*, 4*a*, and/or 4*b* may be used to avoid detrimental effects on coupling as described herein.

Figure 7:
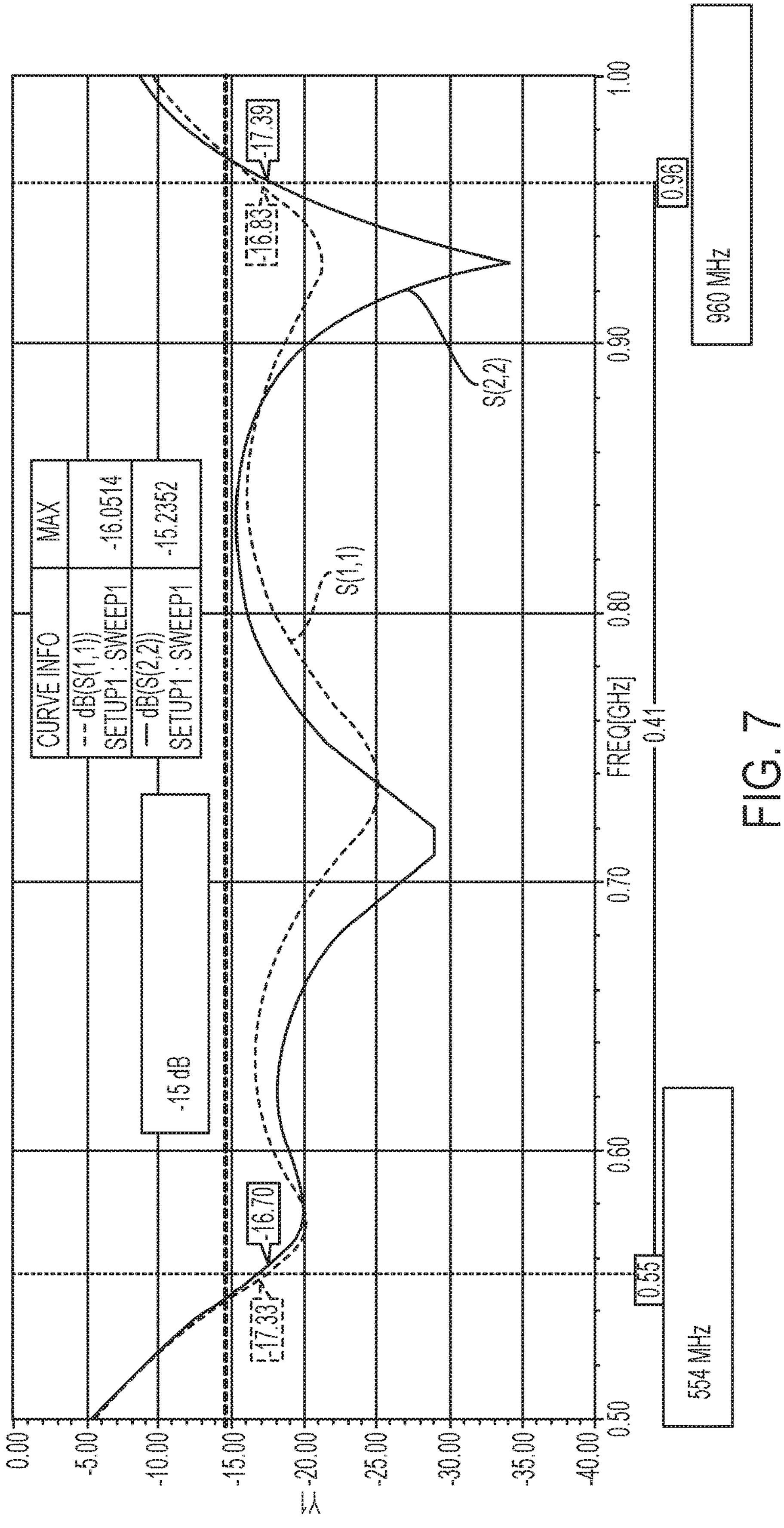
FIG. 7 is a graph illustrating return loss of a dipole antenna including a wideband low-band radiating, element in accordance with some embodiments of the present disclosure.
Figure 8:
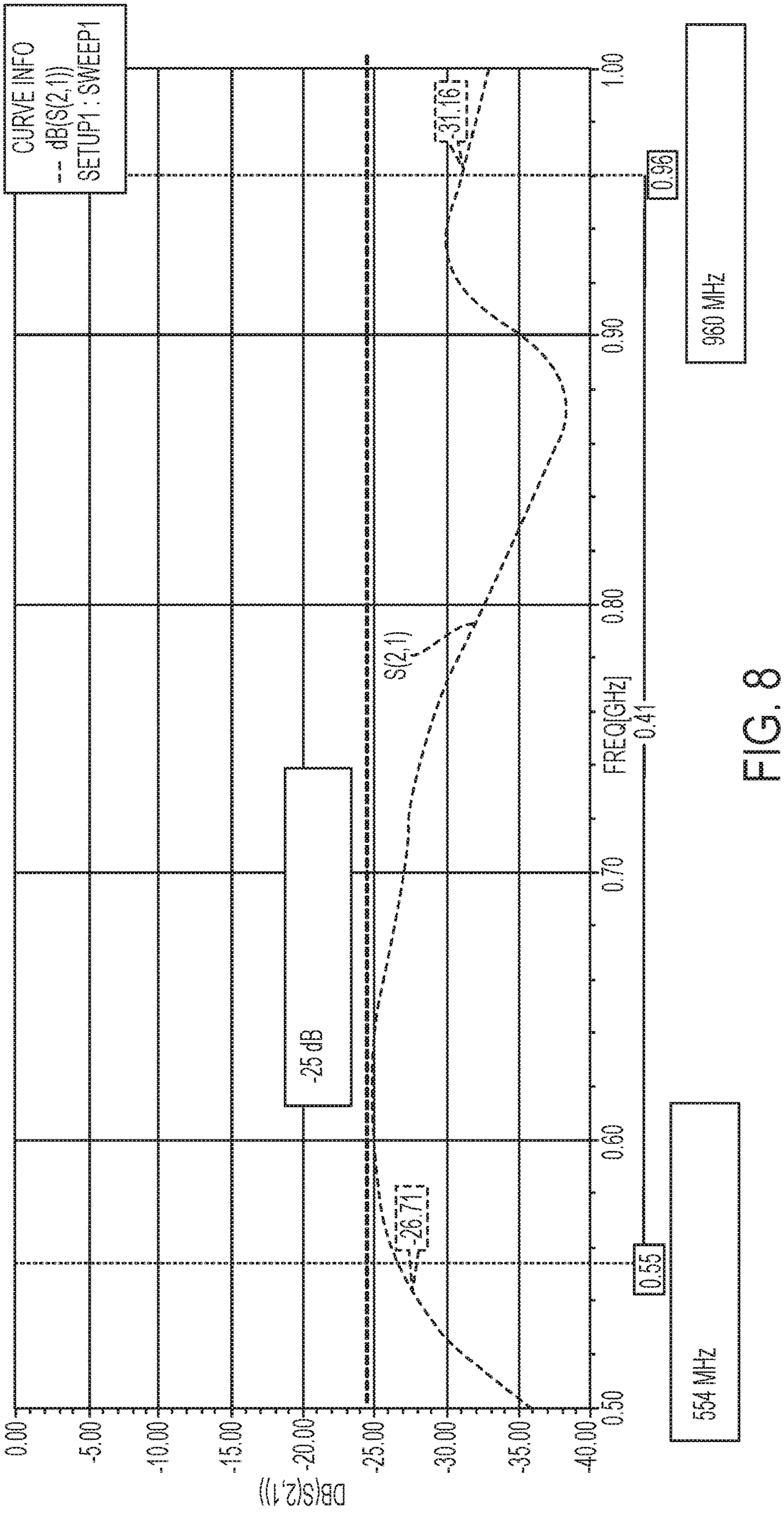
FIG. 8 is a graph illustrating isolation between feed ports 1 and 2 of the dipole antenna including a wideband low-band radiating element in accordance with some embodiments of the present disclosure.

FIG. 7 is a graph illustrating return loss of a dipole antenna including a wideband low-band radiating element in accordance with some embodiments of the present disclosure. FIG. 8 is a graph illustrating isolation between ports 1 and 2 of the dipole antenna including a wideband low-band radiating element in accordance with some embodiments of the present disclosure. In FIGS. 7 and 8, the X-axis represents a frequency range of about 500 MHz to about 1 GHz, and the Y-axis represents normalized power level.

The curves shown in FIG. 7 illustrate the return loss (in dB) at port 1 (shown as curve S(1,1)) and at port 2 (shown as curve S(2,2)). As shown in FIG. 7, the return loss at each of the antenna ports 1 and 2 is less than 15 dB over the entire wideband low-band operating, frequency range of about 554 MHz to about 960 MHz. FIG. 7 thus illustrates a relatively low ratio of reflected waves at both ports 1 and 2 over the operating range of wideband low-band radiating elements as described herein.

The curve shown in FIG. 8 illustrates isolation (in dB) between port 2 and port 1 (shown as curve S(2,1)). As shown in FIG. 8, isolation between the antenna ports 2 and 1 of wideband low-band radiating elements as described herein is better than 25 dB over the entire wideband low-band operating frequency range of about 554 MHz to about 960 MHz.

Figure 9:
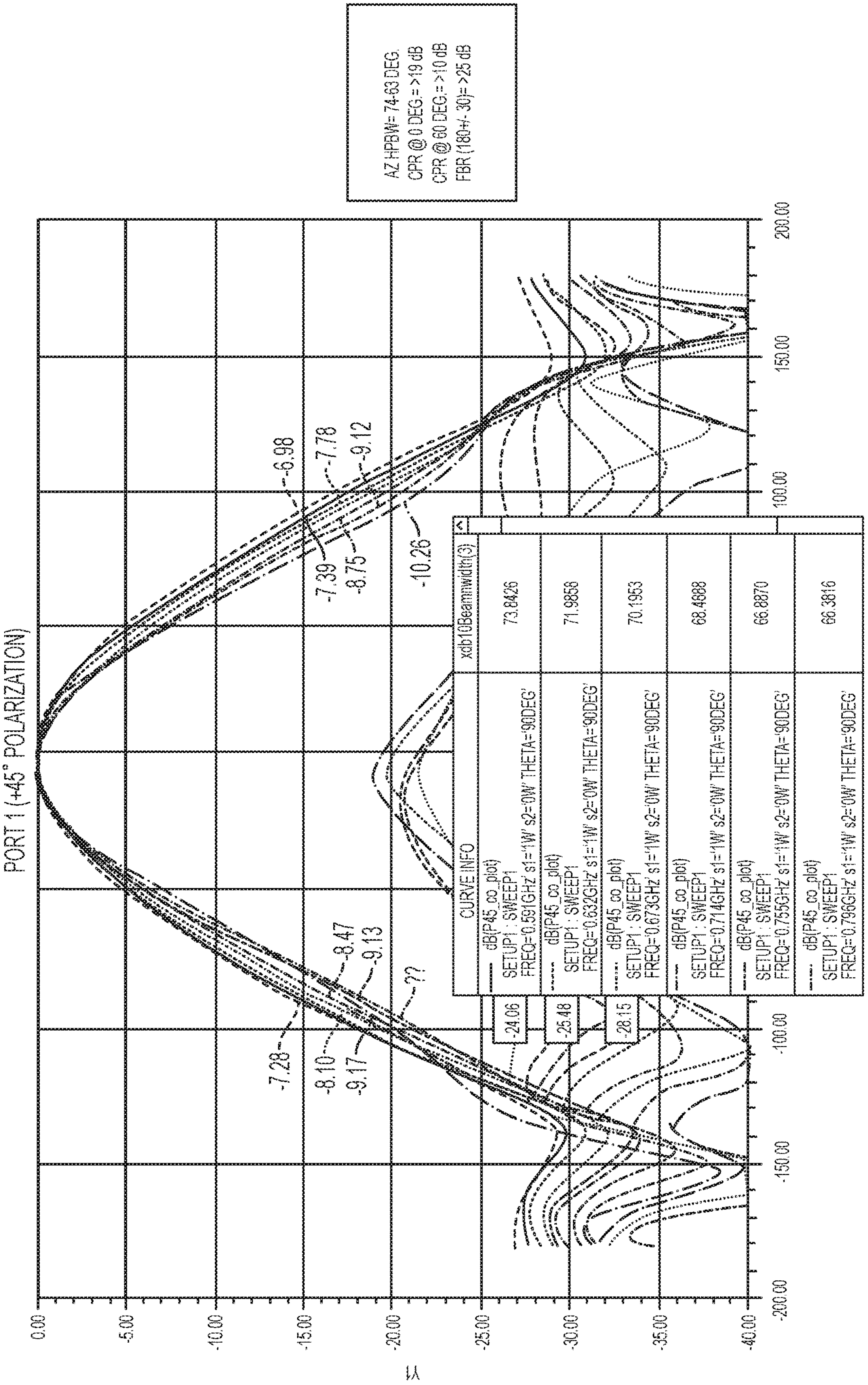
FIGS. 9 and 10 are plots illustrating azimuth beam width patterns of dipole antennas including wideband low-band radiating elements in accordance with some embodiments of the present disclosure.
Figure 10:
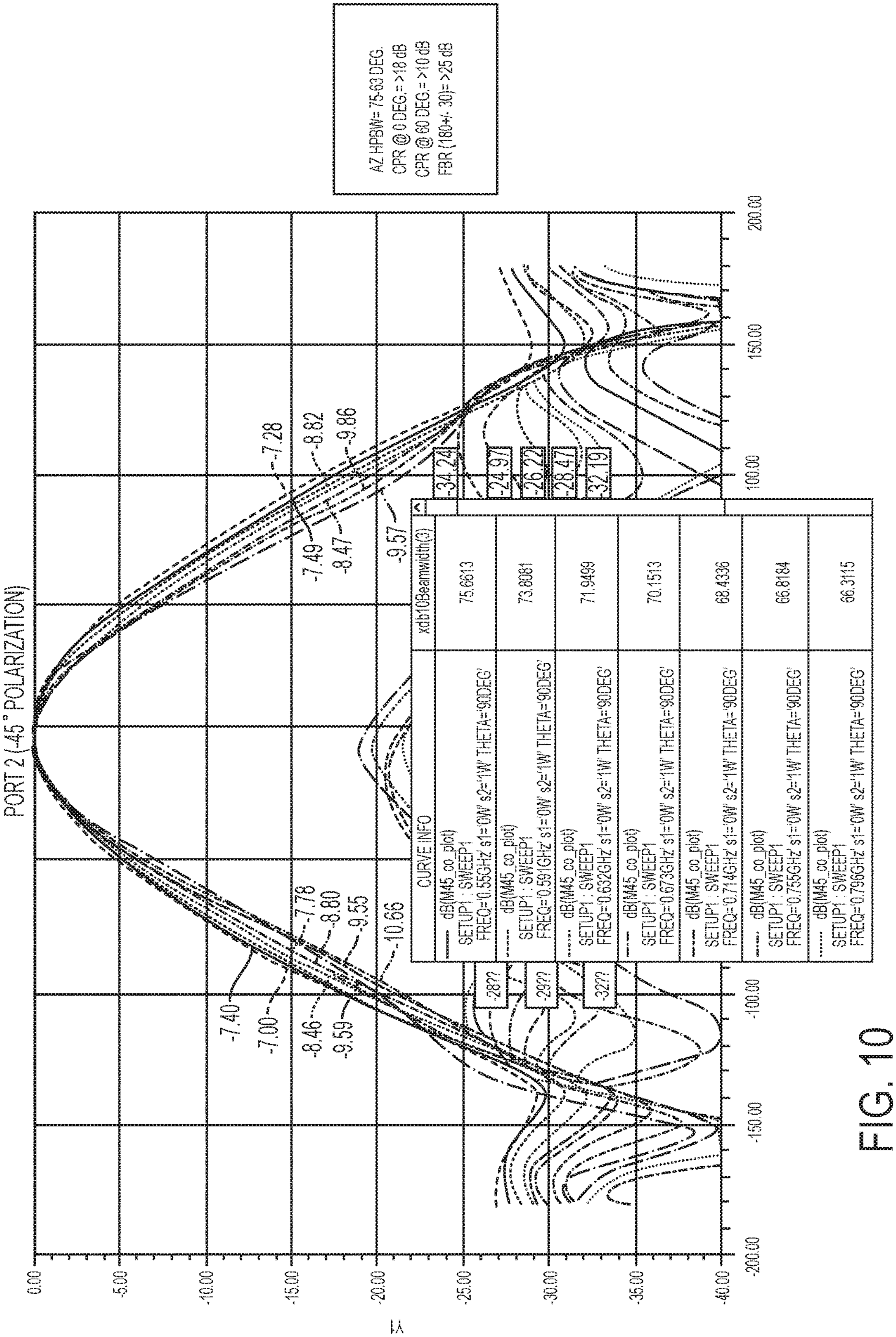

FIGS. 9 and 10 are plots illustrating azimuth beamwidth patterns of dipole antennas including wideband low-band radiating elements in accordance with some embodiments of the present disclosure. FIG. 9 illustrates the port 1 radiation pattern (+45 polarization), while FIG. 10 illustrates the port 2 radiation pattern (−45 polarization). In FIGS. 9 and 10, the X-axis represents azimuth angle and the Y-axis represents normalized power level. Each curve illustrated in FIGS. 9 and 10 illustrates an azimuth beam width pattern for a different frequency over the 554-960 MHz range. In particular, azimuth beamwidth patterns at frequencies of 550 MHz, 591 MHz, 632 MHz, 673 MHz, 714 MHz, 755 MHz, and 796 MHz are shown by way of example. A cross-polarization ratio (CPR) at the various azimuth angles shown on the X-axis may indicate the amount of isolation between orthogonal polarizations of signals transmitted by each of the first and second dipole antennas 3, 4. Azimuth half-power (−3 dB) beamwidths of approximately 65 degrees may be preferred, but may be in the range of about 60 degrees to about 75 degrees. FIGS. 9 and 10 illustrate that the beam shape, boresight angle gain, CPR, and front-to-back ratio (FBR) are relatively consistent over the 554-960 MHz range and over the range of illustrated azimuth angles (−200 to 200 degrees), and that wideband low-band radiating, elements in accordance with embodiments of the present disclosure can achieve a reasonable tradeoff between these parameters.

Figure 11:
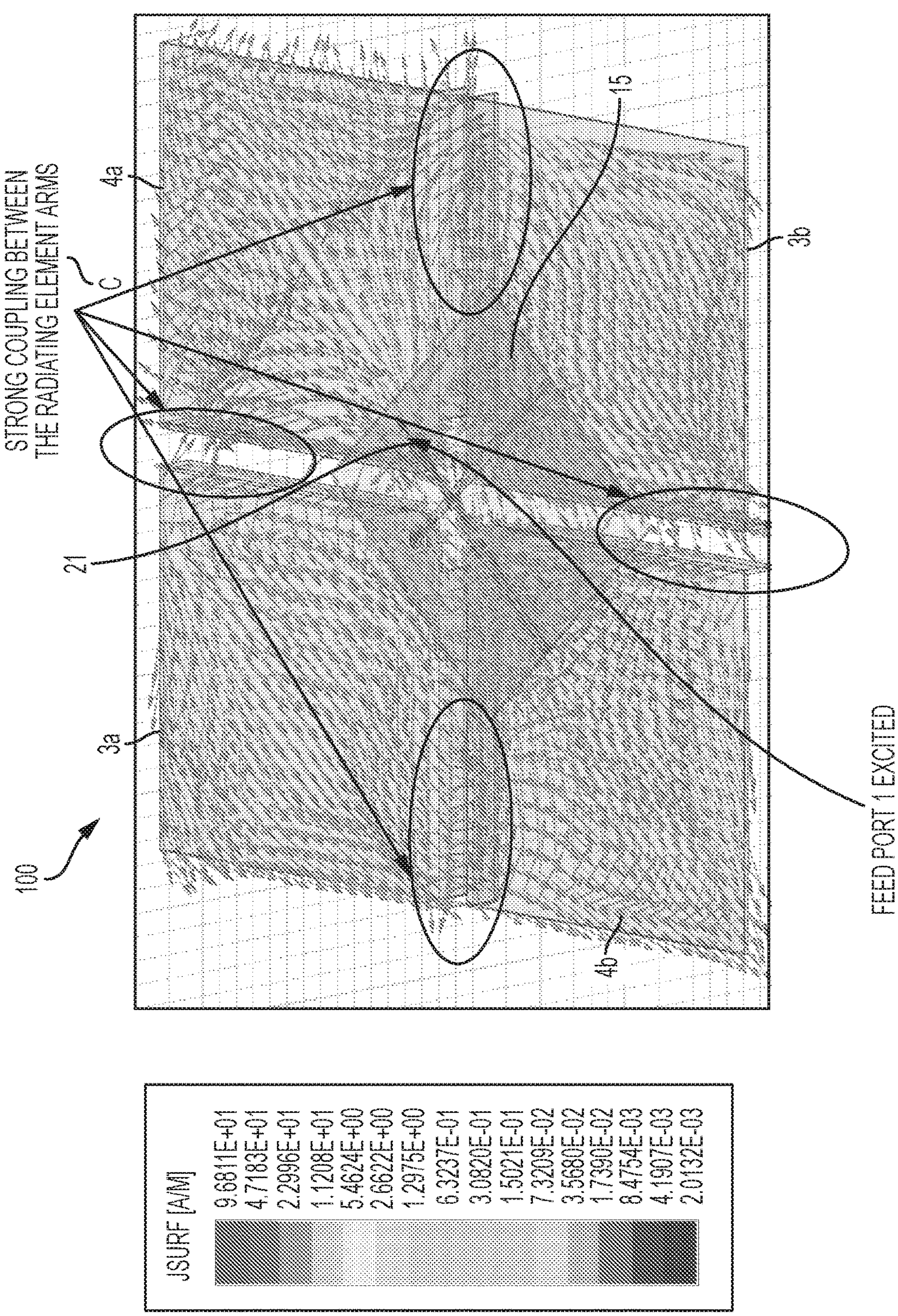
FIG. 11 is a perspective view illustrating surface current distribution for a wideband low-band radiating element of a dipole antenna in accordance with some embodiments of the present disclosure in response to excitation of feed port 1.
Figure 12:
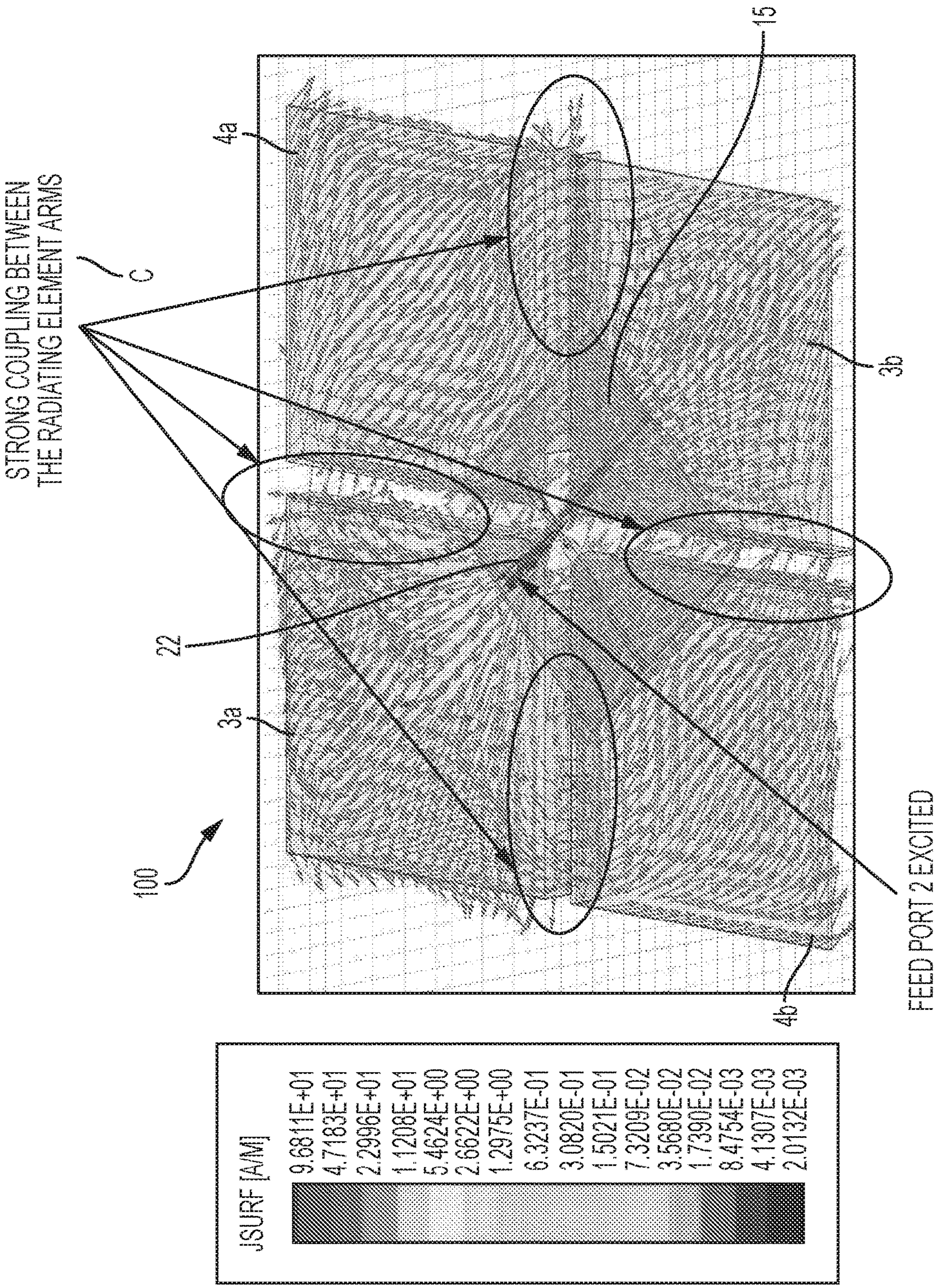
FIG. 12 is a perspective view illustrating surface current distribution for a wideband low-band radiating element of a dipole antenna in accordance with some embodiments of the present disclosure in response to excitation of feed port 2.

FIGS. 11 and 12 are perspective views illustrating surface current distribution in response to excitation of feed ports 1 and 2, respectively, for a wideband low-band radiating element of a dipole antenna 100 in accordance with some embodiments of the present disclosure. In FIG. 11, feed port 1 is excited through opening 21 in arm segment 4*a*. In FIG. 12, feed port 2 is excited through opening 22 in arm segment 3*a*. The current distributions shown in FIGS. 11 and 12 correspond to operation at a center frequency $f_0$ of the 554-960 MHz operating range. FIGS. 11 and 12 illustrate that strong coupling C is achieved between the arm segments 3*a* and 4*a*, between the arm segments 3*a* and 4*b*, between the arm segments 3*b* and 4*a*, and between the arm segments 3*b* and 4*b*, based on the shapes and configurations of the radiating element 10 and the feed element 15 described herein.

Antennas as described herein can support multiple frequency bands and technology standards. For example, wireless operators can deploy using a single antenna Long Term Evolution (LTE) network for wireless communications in the 2.6 GHz and 700 MHz bands, while supporting Wideband Code Division Multiple Access (W-CDMA) network in the 2.1 GHz band. For ease of description, the antenna array is considered to be aligned vertically. Embodiments described herein can utilize dual orthogonal polarizations and support multiple-input and multiple-output (MIMO) implementations for advanced capacity solutions. Embodiments described herein can, support multiple air-interface technologies using multiple frequency bands presently and in the future as new standards and bands emerge in wireless technology evolution.

Although embodiments are described herein with reference to dual-polarized antennas, the present disclosure may also be implemented in a circularly polarized antenna in which the four dipoles are driven 90° out of phase.

Although embodiments have been described herein primarily with respect to operation in a transmit mode (in which the antennas transmit radiation) and a receive mode (in which the antennas receive radiation), the present disclosure may also be implemented in antennas which are configured to operate only in a transmit mode or only in a receive mode.

Embodiments of the present disclosure have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

Relative terms such as "below" or "above" or "upper" or "lower" or "horizontal" or "vertical" or "front" or "back" or "top" or "bottom" may be used herein to describe a relationship of one element, layer or region to another element, layer or region as illustrated in the figures. It will be understood that these terms are intended to encompass different orientations of the device in addition to the orientation depicted in the figures.

Unless otherwise defined, all technical and scientific terms used herein have the same meaning as commonly understood by one of ordinary skill in the art to which this invention belongs. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence, or addition or one or more other features, integers, steps, operations, elements, components, and/or groups thereof.

Aspects and elements of all of the embodiments disclosed above can be combined in any way and/or combination with aspects or elements of other embodiments to provide a plurality of additional embodiments.

In the drawings and specification, there have been disclosed typical embodiments of the invention and, although specific terms are employed, they are used in a generic and descriptive sense only and not for purposes of limitation, the scope of the invention being set forth in the following claims.

That which is claimed:

1. A dipole antenna, comprising:
a reflector; and
a radiating element comprising arm segments defining first and second dipoles that are arranged in a crossed dipole arrangement above a surface of the reflector, the arm segments comprising substantially planar top surfaces and side surfaces at edges of the substantially planar top surfaces,
wherein the substantially planar top surfaces extend over a majority of an area between opposing sides of the arm segments,
wherein the side surfaces of the arm segments extend toward the reflector,
wherein each of the arm segments comprises at least two of the side surfaces,
wherein the substantially planar top surfaces of the arm segments define respective closed rectangular shapes in plan view, and
wherein one of the arm segments of the first dipole and one of the arm segments of the second dipole comprise respective openings therein through which first and second conductive transmission lines are coupled, respectively.

2. The dipole antenna of claim 1, wherein the substantially planar top surfaces of the arm segments comprise first, second, third, and fourth surfaces that are coplanar.

3. The dipole antenna of claim 1, wherein the arm segments comprise sheet metal, and wherein the side surfaces of the arm segments at the edges of the substantially planar top surfaces thereof comprise bent portions of the sheet metal.

4. The dipole antenna of claim 1, wherein the arm segments comprise sheet metal including bent portions between the substantially planar top surfaces and the side surfaces of the arm segments, and wherein the bent portions of the sheet metal provide capacitive coupling regions for the arm segments.

5. The dipole antenna of claim 1, wherein the arm segments comprise the side surfaces at two of the edges of the substantially planar top surfaces thereof, wherein the two of the edges are adjacent one another.

6. The dipole antenna of claim 1, further comprising:
a feed element comprising the first and second conductive transmission lines that are capacitively coupled to the arm segments of the first and second dipoles, respectively.

7. The dipole antenna of claim 6, wherein the feed element comprises a printed circuit board including the first and second conductive transmission lines thereon.

8. A method of fabricating a dipole antenna, the method comprising:
providing a reflector; and
providing a radiating element comprising arm segments defining first and second dipoles that are arranged in a crossed dipole arrangement above a surface of the reflector, the arm segments comprising substantially planar top surfaces and side surfaces at edges of the substantially planar top surfaces,
wherein the substantially planar top surfaces extend over a majority of an area between opposing sides of the arm segments, wherein the side surfaces of the arm segments extend toward the reflector, wherein each of the arm segments comprises at least two of the side surfaces, wherein the substantially planar top surfaces of the arm segments define respective closed rectangular shapes in plan view, and wherein one of the arm segments of the first dipole and one of the arm segments of the second dipole comprise respective openings therein through which first and second conductive transmission lines are coupled, respectively.

9. The method of claim 8, wherein the substantially planar top surfaces of the arm segments comprise first, second, third, and fourth surfaces that are coplanar.

10. The method of claim 8, wherein the arm segments comprise sheet metal, and wherein the side surfaces of the arm segments at the edges of the substantially planar top surfaces thereof comprise bent portions of the sheet metal.

11. The method of claim 8, wherein the arm segments comprise sheet metal including bent portions between the substantially planar top surfaces and the side surfaces of the arm segments, and wherein the bent portions of the sheet metal provide capacitive coupling regions for the arm segments.

12. The method of claim 8, wherein the arm segments comprise the side surfaces at two of the edges of the substantially planar top surfaces thereof, wherein the two of the edges are adjacent one another.

13. The method of claim 8, further comprising:

providing a feed element comprising the first and second conductive transmission lines that are capacitively coupled to the arm segments of the first and second dipoles, respectively.

14. The method of claim 13, wherein the feed element comprises a printed circuit board including the first and second conductive transmission lines thereon.

* * * * *